US008793359B1

(12) United States Patent
Fiebig et al.

(10) Patent No.: US 8,793,359 B1
(45) Date of Patent: Jul. 29, 2014

(54) SYSTEMS AND/OR METHODS FOR INTELLIGENTLY DETECTING API KEY DOMAINS

(71) Applicant: Software AG, Darmstadt (DE)

(72) Inventors: Thorsten Fiebig, Mannheim (DE); Gary Woods, Seeheim (DE); Daniel Adelhardt, Bockhorn (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 14/088,732

(22) Filed: Nov. 25, 2013

(51) Int. Cl.
*G06F 15/173* (2006.01)
*G06F 3/00* (2006.01)
*G06F 9/44* (2006.01)
*G06F 9/46* (2006.01)
*G06F 13/00* (2006.01)

(52) U.S. Cl.
USPC .......................................... 709/223; 719/313

(58) Field of Classification Search
USPC ............................ 709/223; 719/313, 320, 331
See application file for complete search history.

(56) References Cited

U.S. PATENT DOCUMENTS

| | | | |
|---|---|---|---|
| 2005/0203949 A1* | 9/2005 | Cabrera et al. | 707/103 R |
| 2008/0033845 A1* | 2/2008 | McBride et al. | 705/28 |
| 2008/0209451 A1 | 8/2008 | Michels et al. | |
| 2009/0089109 A1* | 4/2009 | Rabetge et al. | 705/7 |
| 2009/0292797 A1* | 11/2009 | Cromp et al. | 709/223 |
| 2010/0017368 A1* | 1/2010 | Mao et al. | 707/3 |
| 2010/0257587 A1* | 10/2010 | Chazin | 726/3 |
| 2012/0180029 A1 | 7/2012 | Hill et al. | |
| 2013/0262646 A1* | 10/2013 | Fiebig et al. | 709/223 |

OTHER PUBLICATIONS

Wikipedia—Application Programming Interface (API), retrieved online Nov. 19, 2013. http://en.wikipedia.org/wiki/Application_programming_interface.
Wikipedia—Web API, retrieved online Nov. 19, 2013. http://en.wikipedia.org/wiki/Web_API.
Search Cloud Applications, API Management Definition, retrieved online Nov. 19, 2013. http://searchcloudapplications.techtarget.com/definition/API-management.
Wikipedia—Mashup (Web Application Hybrid), retrieved online Nov. 19, 2013. http://en.wikipedia.org/wiki/Mashup_(web_application_hybrid.
OAuth—Introduction, retrieved online Nov. 19, 2013. http://oauth.net/about/.
Wikipedia—Hypertext Transfer Protocol (HTTP), retrieved online Nov. 19, 2013. http://en.wikipedia.org/wiki/Hypertext_Transfer_Protocol.
Wikipedia—Complex Event Processing, retrieved online Nov. 19, 2013. http://en.wikipedia.org/wiki/Complex_event_processing.

(Continued)

*Primary Examiner* — Shirley Zhang
(74) *Attorney, Agent, or Firm* — Nixon & Vanderhye PC

(57) ABSTRACT

Certain example embodiments described herein relate to an application programming interface (API) management system and/or method that automatically detects API domains, e.g., by analyzing consumer registration and runtime data, while also allowing API providers to provide approval for proposed detected domains and/or continued governance. The technology set forth herein not only provides an automatic detection mechanism, but also provides the capability of full management/control, while also allowing API producers to dynamically expand or otherwise modify their API domain offerings based on usage, etc. This dynamic process can be fully or partially automated and is efficient.

30 Claims, 6 Drawing Sheets

(56) References Cited

OTHER PUBLICATIONS

Wikipedia—Data Stream Management System, retrieved online Nov. 19, 2013. http://en.wikipedia.org/wiki/Data-stream_management_system.
Mashery—Overview: API Management, retrieved online Nov. 19, 2013. http://www.mashery.com/product.
MuleSoft—Integration Platform for Connecting SaaS and Enterprise Applications, retrieved online Nov. 19, 2013. http://www.mulesoft.com/.
APIHub—Build a World-Class Developer Community, retrieved online Nov. 19, 2013. http://www.apihub.com/.
APIGee—Enterprise API Management, retrieved online Nov. 19, 2013. http://apigee.com/about/.
APIGee—APIGee Documentation, retrieved online Nov. 19, 2013. http://apigee.com/docs/.
3Scale—API Management, retrieved online Nov. 19, 2013. http://www.3scale.net/api-management/.
APIFy—Key Features, retrieved online Nov. 19, 2013. http://apify.co/key-features/.
Axway—API Management, retrieved online Nov. 19, 2013. http://www.vordel.com/solutions/.
Mashape—How Mashape Connects Developers and APIs, retrieved online Nov. 19, 2013. https://www.mashape.com/howitworks.
Apiary, retrieved online Nov. 19, 2013. http://apiary.io/.
CentraSite Free Download Center—FAQs, retrieved online Nov. 19, 2013. http://www.centrasite.com/faq.html.
SOA Software—API Management, retrieved online Nov. 19, 2013. http://www.soa.com/.
W3C—Xquery 3.0: An XML Query Language, retrieved online Nov. 19, 2013. http://www.w3.org/TR/2013/WD-xquery-30-20130723/.

* cited by examiner

| Event Type | Time | Consumer | Location | API |
|---|---|---|---|---|
| Call | 2013-05-30T09:30:10.100Z | RealEstate.com | 109.22.161.16 | GetRealEstateInfoByZip |
| Call | 2013-05-30T09:30:10.125Z | Sample.com | 110.25.161.17 | GetMapByZip |
| Call | 2013-05-30T09:30:10.150Z | RealEstate.com | 109.22.161.16 | GetSchoolsByZip |
| Call | 2013-05-30T09:30:10.200Z | RealEstate.com | 109.22.161.16 | GetRealEstateInfoByZip |
| Call | 2013-05-30T09:30:10.250Z | Anonymous | Unknown | GetMapByZip |
| Call | 2013-05-30T09:30:10.300Z | RealEstate.com | 109.22.161.16 | GetMapByZip |

Applying rule set:
- Called by same consumer
- Called from same location
- Called within 500 ms Detected domain:
- GetRealEstateInfoByZip
- GetSchoolsEstateInfoByZip Applying rule set:
- Called by same consumer
- Called from same location Detected domain:
- GetRealEstateInfoByZip
- GetSchoolsEstateInfoByZip
- GetMapsByZip

Fig. 3

SYSTEMS AND/OR METHODS FOR INTELLIGENTLY DETECTING API KEY DOMAINS

TECHNICAL FIELD

Certain example embodiments described herein relate to application programming interfaces (APIs) and API domains. More particularly, certain example embodiments described herein relate to an API management system and/or method that automatically detects API domains, e.g., by analyzing consumer registration and runtime data, while also allowing API providers to provide approval for proposed detected domains and/or continued governance.

BACKGROUND AND SUMMARY OF EXAMPLE EMBODIMENTS OF THE INVENTION

As is known, application programming interfaces (APIs) specify how software components interact with each other. This may include, for example, the specification of interfaces for accessing the features of libraries and software development kits (SDKs) or services for building applications. Web APIs enable the development of web applications, typically by simply combining services that can be invoked remotely via protocols such as the hyper test transfer protocol (HTTP). Applications such as these oftentimes have a small amount of client-side logic and sometimes are referred to as "mash-ups." There are number applications that rely on Web APIs. One current popular example of a type of applications that generally relies on Web APIs is the mobile application, frequently referred to simply as an "app." Vendors of Web APIs frequently publish their APIs on the Web and/or otherwise make their Web APIs available. Revenue can be generated by charging consumers when they consume the published APIs, for instance.

There are several challenges when it comes to publishing and charging for API consumption. Such challenges may relate to, for example, tracking the API calls, the identification of the consumer for each call, etc. These problems sometimes are solved by API management systems. There are several API management system products that include basic API management system capabilities. Such products are available from, for example, Mashery, MuleSoft, Apigee, 3Scale, Apify, Axway Mashape, and Apiary.io.

A good API management system may allow an API provider to publish its API and make it available for the intended consumers. APIs can be published on the Web, within an organization to provide access to organization internal services, etc., and published APIs can be searched or browsed by the intended API consumers. Once a consumer has identified an API fulfilling a set of requirements, the consumer can register as a consumer. During registration, the consumer may be provided with the details for invoking the APIs such as, for example, the endpoints where the API can be accessed and a so-called API key.

An API key generally must be provided when an API is called, and it typically is checked by the API management system. On a successful check, the call is booked under the registered consumer that owns the API key. Identifying the registered consumer based on the API key typically is a prerequisite for charging a consumer and rejecting unauthorized calls. Besides simple unencrypted API keys, some API management systems also support more advanced techniques, potentially providing for higher levels of protections like digital signatures, certificates, OAuth tokens, and/or the like.

In a large-scale environment, the self-service aspect can become particularly important. This includes the self-support through communities, as well as the automated selling of API consumption contracts. Therefore, some API management systems provide self-service through techniques including communities and developer portals.

To simplify the offering of APIs, some API management systems provide the ability to bundle APIs into API domains. API domains, also known as API packages, API products, etc., can be provided with capabilities like access policies including service-level agreements (SLAs). For example, the usage of an API can be restricted to a certain number of calls that can be performed by a given consumer within a given time period.

In existing API management systems, API domains generally are defined by API providers. For defining API domains that are useful for consumers, information concerning how consumers are using the APIs can be beneficial. This at least implies that providers should know, for example, which APIs are consumed together and could therefore be put into an API domain and offered to consumers.

Certain example embodiments help solve the issue of identifying which APIs are consumed together and could therefore be put into an API domain and offered to consumers. More particularly, certain example embodiments involve an approach to detecting useful groups of APIs for defining API domains, e.g., based on monitoring API consumption. The monitored API consumption may in certain example embodiments may include, for example, consumer registration data, data resulting from tracking API calls, and/or the like.

One aspect of certain example embodiments relates to an API management system automatically detecting API domains by analyzing registration data and API invocation events.

Another aspect of certain example embodiments relates to an API domain detection process that combines detected domains by analyzing API invocation events with already registered domains.

Another aspect of certain example embodiments relates to an API management system with an event bus between API gateways and registry/repository, e.g., to enable a complex event processing (CEP) based implementation of the API domain detection process. Alternatively, or in addition, storing API invocation events may be stored in an event store to run the API domain detection process on-demand.

Still another aspect of certain example embodiments relates to an approval process that collects the feedback from an API provider for API domains and API domain extensions.

Still another aspect of certain example embodiments relates to approval process that in essence asks API consumers if they are interested in any of the API domain and API domain extension proposals.

Yet another aspect of certain example embodiments relates to governing API domains via a lifecycle model that includes, for example, state change policies for triggering the approval processes.

Yet another aspect of certain example embodiments relates to an automatic detection mechanism for API domains and, with the help of CEP techniques, being able to expand this detection into several new features including, for example, the governing of API domains via a lifecycle model that may include state change policies for triggering the approval processes.

In certain example embodiments, an application programming interface management system. APIs that each have a native endpoint are provided. Gateways provide virtual endpoints to respective APIs, and are configured to identify consumers attempting to access the APIs and forward API calls for authorized consumers to the native endpoints. A registry is stored on a non-transitory computer readable storage medium. The registry stores (a) registration information indicating which consumers have registered for which APIs, (b) metadata that includes information concerning operations supported by, and native and virtual endpoint information for, the APIs, and (c) runtime data from the gateways for at least API call type events, with the runtime data including, for each API call type event, a timestamp, a consumer identifier, a location, and an identifier of the API being called. A communications channel is defined between the gateways and the registry, with the communications channel being configured to transmit runtime data from the gateways to the registry. Processing resources comprise at least one processor and a memory are configured to detect API domains by analyzing the registration information and the runtime data from the gateways, with each said detected API domain including at least two of the APIs. For a given detected API domain, an indication is received as to whether the respective detected API domain is approved of by a provider of the APIs included therein, and in response to the respective detected API domain being approved of by the provider, the respective detected API domain is registered with the registry by storing in the registry metadata including information concerning operations supported by, and native and virtual endpoint information for, the respective detected API domain.

According to certain example embodiments, the processing resources may be further configured to respond to a consumer registering for a plurality of APIs by at least: generating API domain proposals by analyzing the registration information and the runtime data from the gateways, each said API domain proposal including at least two of the APIs; and for each said API domain proposal: receiving first input indicating whether the respective domain proposal is approved of by a provider of the APIs included therein; in response to the respective domain proposal being approved of by the provider, receiving second input indicating whether the respective domain proposal is accepted by the consumer registering for the APIs; and in response to the respective domain proposal being approved of by the provider and accepted by the consumer registering for the APIs, registering the respective domain proposal with the registry as an API domain by storing in the registry registration information indicating that the consumer has registered for the respective API domain, and by storing metadata including information concerning operations supported by, and native and virtual endpoint information for, the respective API domain.

According to certain example embodiments, the processing resources may be further configured to at least analyze the runtime data from the gateways by applying at least one set of one or more rules thereto in order to identify APIs that likely are consumed together and thus should be included in an API domain proposal presented for approval by the provider of the APIs therein. At least one of said set of rules may group together APIs that are invoked by the same consumer and from the same location, optionally additionally based on whether they occurred within a predetermined timeframe.

According to certain example embodiments, the processing resources may be further configured to filter API domain proposals based on the registration data, e.g., so that a given API domain proposal is presented as a detected API domain only if there are a predetermined number of consumers who have each registered for the all of the APIs in that given API domain proposal.

According to certain example embodiments, the processing resources may be further configured to at least generate a proposal for extending an already-existing API domain if a detected domain includes a superset of the APIs included in that already-existing API domain.

According to certain example embodiments, the processing resources may be further configured to at least subject the events on an event channel to complex event processing (CEP) queries, e.g., with the CEP queries including continuous queries that, through windowing, identify time-based relations between different API call type events. For instance, CEP queries may at least: identify related API call type events; create domain detection events in response to the identification of related API call type events; filter created domain detection events based on the runtime data and the registration data; and generate events corresponding to domain proposals and/or domain extension proposals in response to the filtering.

According to certain example embodiments, the gateways may be further configured to provide service-level agreement (SLA) enforcement.

According to certain example embodiments, the registry may be configured to enforce a predefined domain lifecycle in connection with API domains, the predefined domain lifecycle optionally being defined in accordance with one or more associated policies and/or possibly specifying when proposed API domains should be automatically approved by a provider and/or accepted by a consumer.

In certain example embodiments, a method of managing application programming interfaces is provided. Gateways providing virtual endpoints to APIs that have respective native endpoints are provided, with the gateways being configured to identify consumers attempting to access the APIs and forward API calls for authorized consumers to the native endpoints. In a registry provided on a non-transitory computer readable storage medium, there is stored (a) registration information indicating which consumers have registered for which APIs, (b) metadata that includes information concerning operations supported by, and native and virtual endpoint information for, the APIs, and (c) runtime data from the gateways for at least API call type events, with the runtime data including, for each API call type event, a timestamp, a consumer identifier, a location, and an identifier of the API being called. API domains are detected (e.g., via at least one processor) by analyzing the registration information and the runtime data from the gateways, with each said detected API domain including at least two of the APIs. For at least some of the detected API domains, the method further includes (e.g., using at least one processor for): receiving an indication as to whether the respective detected API domain is approved of by a provider of the APIs included therein; and in response to the respective detected API domain being approved of by the provider, registering the respective detected API domain with the registry by storing in the registry metadata including information concerning operations supported by, and native and virtual endpoint information for, the respective detected API domain.

In certain example embodiments, a method of managing application programming interfaces is provided. Gateways providing virtual endpoints to APIs that have respective native endpoints are provided, with the gateways being configured to identify consumers attempting to access the APIs and forward API calls for authorized consumers to the native endpoints. In a registry provided on a non-transitory computer readable storage medium, there is stored (a) registration information indicating which consumers have registered for which APIs, (b) metadata that includes information concerning operations supported by, and native and virtual endpoint information for, the APIs, and (c) runtime data from the gateways for at least API call type events, with the runtime data including, for each API call type event, a timestamp, a consumer identifier, a location, and an identifier of the API being called. The method further includes responding to a consumer registering for a plurality of APIs by (e.g., using at least one processor to) at least: generating API domain proposals by analyzing the registration information and the runtime data from the gateways, each said API domain proposal including at least two of the APIs; and for at least some of said API domain proposals, receiving first input indicating whether the respective domain proposal is approved of by a provider of the APIs included therein; in response to the respective domain proposal being approved of by the provider, receiving second input indicating whether the respective domain proposal is accepted by the consumer registering for the APIs; and in response to the respective domain proposal being approved of by the provider and accepted by the consumer registering for the APIs, registering the respective domain proposal with the registry as an API domain by storing in the registry registration information indicating that the consumer has registered for the respective API domain, and by storing metadata including information concerning operations supported by, and native and virtual endpoint information for, the respective API domain.

In certain example embodiments, there are provided non-transitory computer readable storage mediums tangibly storing instructions that, when executed by at least one processor of a computer system, perform the above-described and/or other methods.

Similarly, in certain example embodiments, a computer system including a processor, a memory, and a non-transitory computer readable medium, is configured to execute computer functions for accomplishing the above-described and/or other methods. For instance, in certain example embodiments, a computer system including a processor, a memory, and a non-transitory computer readable medium, may host a master gateway registry configured to at least perform the above-described and/or other methods.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 3 illustrates how domain detection rules may be applied in accordance with certain example embodiments;

DETAILED DESCRIPTION OF EXAMPLE EMBODIMENTS OF THE INVENTION

Certain example embodiments relate to an application programming interface (API) management system that automatically detects API domains, e.g., by analyzing consumer registration and runtime data. The runtime data maybe analyzed by performing domain detection processes including, for example, applying complex event processing (CEP) techniques to detect domains from API call events. The detected domains may be filtered based on consumer registration data. The domain detection and filtering may in certain example embodiments be performed in connection with rules that can be easily implemented and efficiently executed on large event sets, e.g., as handled by API management systems deployed in large-scale environments. Based on the filtered domains, domain and domain extensions proposals may be created. The domain detection process can be applied continuously and/or on-demand, e.g., with respect to historical data. On-demand execution may be enabled by leveraging an event store for storing the API call events, for example.

The proposals resulting from the domain detection process may be subjected to an approval process in certain example embodiments. The approval process may notify the providers about the detected domains and domain extensions, allow the providers to grant approval, and propose the approved domains to the consumer. The process may help in getting feedback from API providers before API domains are published and offered to consumers.

Certain example embodiments also provide governance for the API domains beyond the provider approval capabilities mentioned above. An example of the governance that may be provided is the lifecycle management of domains.

Figure 1:
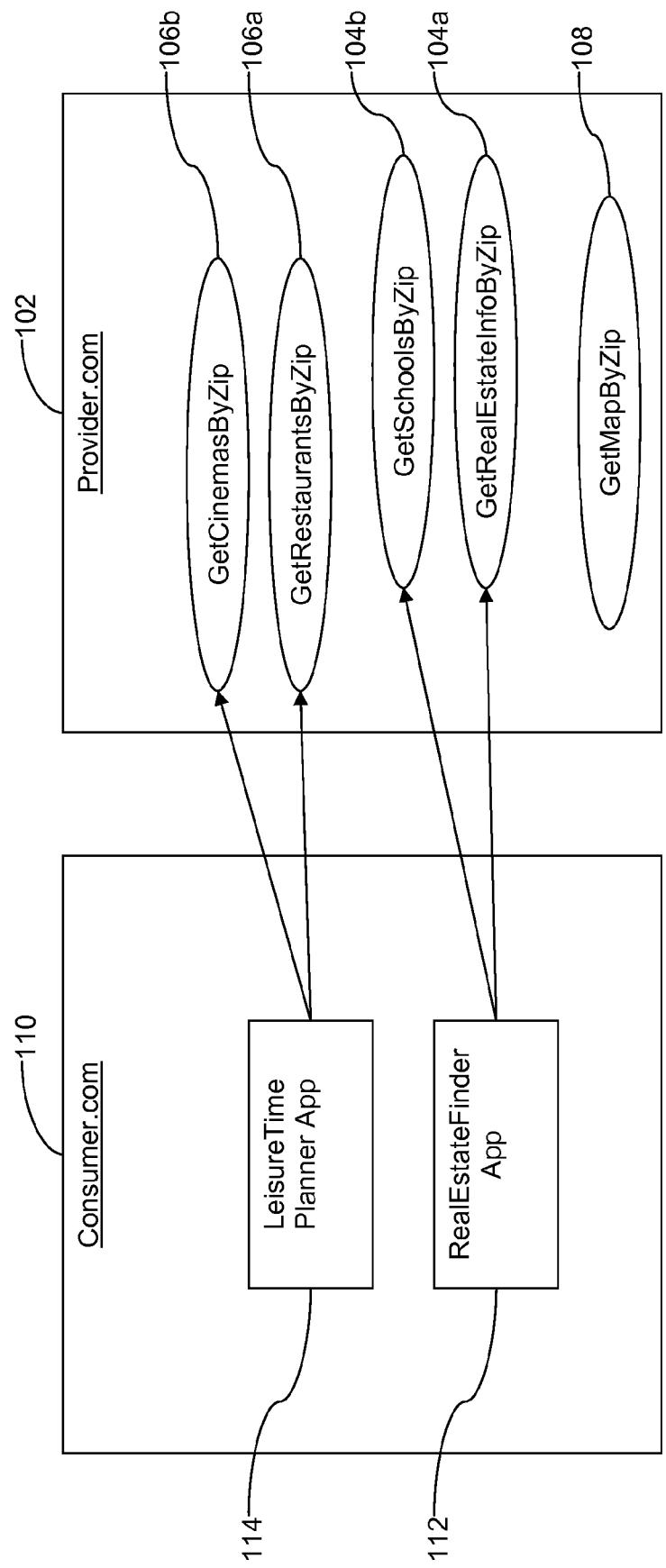
FIG. 1 is a sample usage scenario used to help demonstrate how API domains may be detected in connection with certain example embodiments.

FIG. 1 is a sample usage scenario used to help demonstrate how API domains may be detected in connection with certain example embodiments. The API provider company Provider.com 102 offers location-related information. For instance, it offers an API that provides details about real estate offerings. By providing a zip code, a user can obtain a list of offerings and the corresponding details, using the GetRealEstasteInfoByZip API 104*a*. Other APIs offered by the same company also provide location related infrastructure information. For example, there also is the GetSchoolsByZip API 104*b* that provides a list of schools depending on a zip code. The GetRestaurantsByZip and GetCinemasByZip APIs 106*a* and 106*b* provide information about restaurants and cinemas. Finally, the provider has the GetMapByZip API 108 that returns a map according to zip code. The API provider company publishes its APIs via an API management system.

The API consumer company Consumer.com 110 has implemented the RealEstateFinder mobile app 112 that takes the real estate information and adds to it the list of schools that are nearby. The RealEstateFinder app 112 also allows for the identification of all real estate offerings that are close to a specific school. The join between these two information sets may be performed in connection with the zip code of the school address and the zip code of the real estate offerings. The LeisureTimePlanner mobile app 114 from the same company uses these APIs and provides information helpful when organizing leisure-time activities. For example, it brings together cinema and restaurant information.

Assuming that these mobile apps 112 and 114 become popular, the APIs may be heavily used, together. Even without knowing the two mobile apps 112 and 114, the API provider 102 can analyze the API consumption data and detect two groups of APIs that are used together. This information can be leveraged to define new API domains that can be offered to the API consumer company 110, e.g., to generate additional business.

To help keep control over the offered API domains, the domains might not be offered to API consumers directly. Instead, the new API domains may be proposed to the API provider. The API provider thus may have a chance to accept the proposal and add some additional capabilities, if necessary or desired.

The API management techniques of certain example embodiments support the publishing and consumption of APIs representing services that can be invoked remotely, e.g., in a large-scale environment. Example service types include SOAP or RESTful services. To authorize the calls of an API, the caller of an API provides a so-called API key. This API key can be a globally unique identifier, an OAuth token or any other kind of security token, and/or the like.

An API key does not only address an API but instead may in certain example embodiments also reference certain policies for accessing the API. Example access policies include service level agreements (SLAs) specifying, for instance, the number of requests that can be performed within a given time period. As another example, an SLA may define an access policy for evaluating an API, e.g., only allowing a consumer to perform a certain total number of calls.

A single API may in some implementations have multiple SLA variants, and they may be referred to API capabilities. For example, referring back to FIG. 1, Provider.com 102 may offer the GetRealEstateInfoByZip API 104a with the capabilities representing the SLA levels: "100 calls per day", "1,000 calls per day", unlimited, etc. These SLA levels can be represented by the levels test, commercial, and enterprise, for example.

An API consumer can choose between capability options when requesting an API key for consumption. In this case, the API key that is granted for consumption no longer just references the API, but instead may also be indicative of the chosen capabilities.

Related APIs can be grouped together into API domains. In the FIG. 1 example usage scenario, the APIs GetRestaurantsByZip and GetCinemasByZip 106a and 106b are related to leisure time activities. Therefore, these APIs can be grouped into a domain called LeisureTimeAcitivities or the like. Like a single API, an API domain may also have capabilities. The API domain capabilities may be made to apply to all APIs of that domain. Similar to the discussion above, an API domain has a key that is needed to consume the APIs of the domains and the chosen API domain capabilities.

Example API Management System Details

Figure 2:
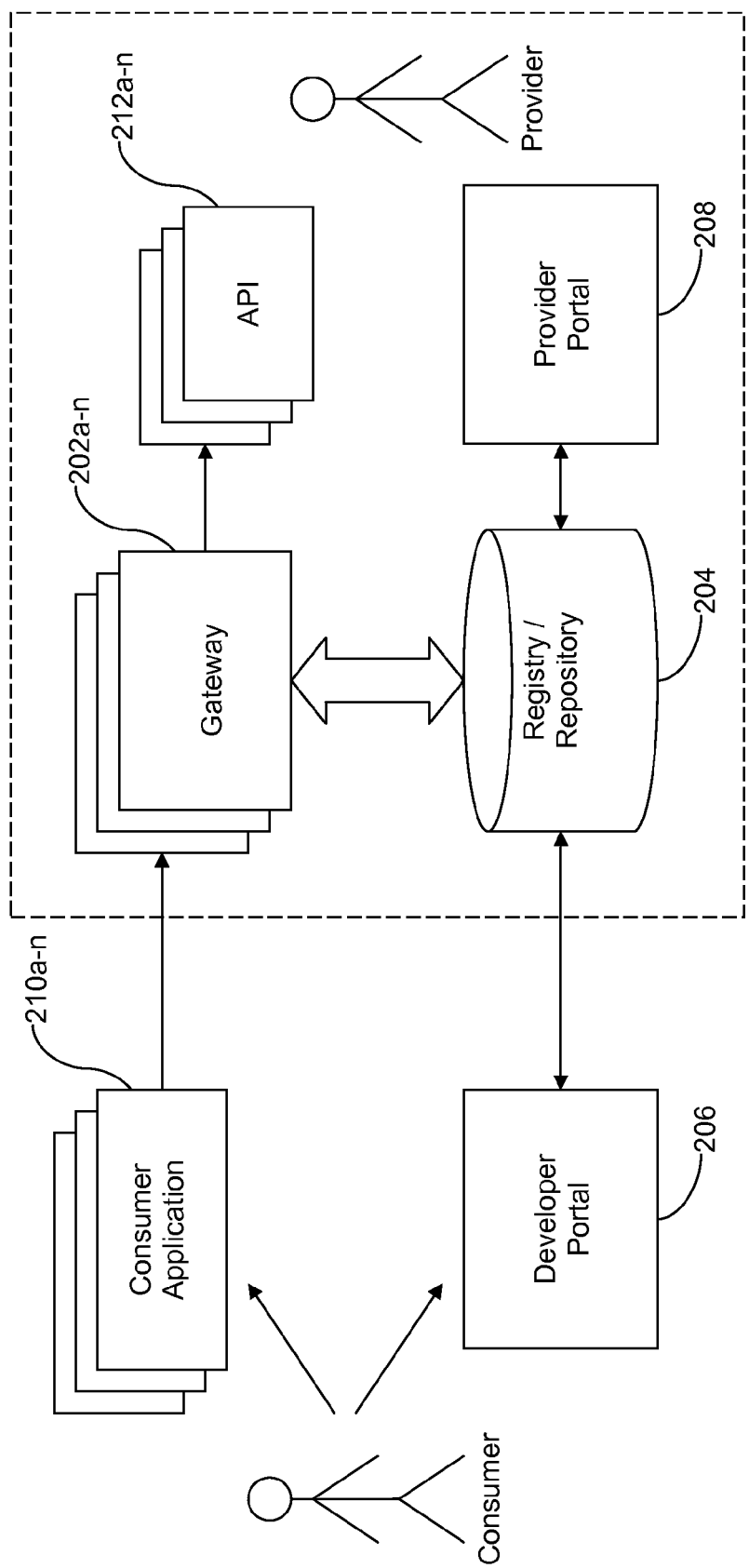
FIG. 2 is an overview of an API management system according to certain example embodiments.

FIG. 2 is an overview of an API management system according to certain example embodiments. The FIG. 2 example management system includes one or more gateways 202a-n, a registry repository 204 with metadata management and governance capabilities, a self-service developer portal 206 and a provider portal 208. Each of these example components will be discussed in greater detail below. It will be appreciated that these example components may help provide one or more consumer applications 210a-n with access to one or more APIs 212a-n that may be organized into API domains, etc.

Example API Gateways

The API gateways 202a-n of certain example embodiments act as a proxy between the APIs 212a-n provided by the provider and the applications 210a-n driven by the consumer. The provider API endpoints thus are not directly exposed to the consumers. Instead, a published API 212a-n has a virtual endpoint deployed on one or more gateways 202a-n. Any API calls issued by the consumer applications 210a-n are processed by an appropriate gateway 202. The API gateways 202a-n thus may help to decouple the provider APIs 212a-n from the consumer applications 210a-n. This advantageously makes it possible to perform additional processing on incoming API invocations without affecting existing consumer applications. Example benefits may include, for instance, flexibility that might otherwise lead to performance degradation. For instance, flexibility may be provided while mitigating performance concerns by choosing the appropriate gateway implementation.

The processing performed by the gateways 202a-n may include consumer identification and the authorization of API calls. Other processing including message and protocol transformation, security checks, SLA enforcement, and/or the like, can also be performed by the gateways 202a-n, and it will be appreciated that known techniques may be used to perform the required functionality.

One prerequisite for authorizing an API call may be consumer identification. Consumers can be identified based on API keys, OAuth tokens, and/or other appropriate means, e.g., as indicated above. To call APIs, consumers may register to the system and acquire the permission to invoke a certain API. If a user has successfully registered for an API, the user may be provided with an API key to be specified when calling that API. The API key may be verified by the API gateways 202a-n in certain example embodiments. On successful authorization, the API call may be forwarded by the gateway to the native endpoint. Each call may be registered, and the runtime data related to the call may be stored in the registry/repository 204, as discussed in greater detail below. The runtime data may include an identifier of the consumer that has called the API.

The API gateways 202a-n may be connected with the registry/repository 204 via an event channel (schematically represented with the two-headed arrow in FIG. 2). Through the event channel, the gateways 202a-n send events representing invocation information and runtime information related to the API invocations.

The registry/repository 204 can invoke actions on the gateways 202a-n such as, for example, deploying a new procedure for processing API calls, updating the API keys that have been granted for a certain API, etc.

Example Registry/Repository

The registry/repository 204 of certain example embodiments manages API management related metadata and the runtime data created by the gateways 202a-n. The registry/repository 204 of certain example embodiments may be provided with governance capabilities such as, for example, those provided by the CentraSite SOA registry/repository. These governance capabilities may include, for example, policy enforcement, lifecycle management, and/or the like. Policies can be enforced on the managed metadata as well as on the event channel that connects the gateways 202a-n with the registry/repository 204.

The registry/repository 204 may be implemented as any appropriate transitory or non-transitory computer readable storage medium and may store all metadata for the APIs 212a-n of the registered API providers. The metadata for an API may include at least the description of the API, including the operations it supports and its native and virtual endpoint information. It may also reference the provider that has published the API and/or the capabilities that have been defined by the provider. The registry/repository 204 may maintain the information about consumers that have registered for consuming the APIs 212a-n. This may also include, for example, information about the issued API keys, and/or the keys themselves.

API domain metadata may be stored in addition to API metadata. Similar to the above, this information may include the description of the API domain, the issued keys, an indication of who has provided the API domain, an indication of who is consuming the domain, etc.

Each API provider may have an account that can have one or more users. The registry/repository 204 thus may correspondingly support the look-up of the APIs belonging to the API provider account. Metrics and/or other information may be obtainable for each individual API and/or API domain. Consumers also may have accounts that can have one or more users. Thus, the registry/repository 204 may support the look-up of the consumed APIs. The API information exposed to consumers may, however, be restricted. For example, the native endpoint information may not be shown to consumers, e.g., to help prevent consumers from bypassing the virtual endpoints and thus undermining the tracking and/or management features provided in certain example implementations.

Example Developer and Provider Portals

The developer portal 206 of certain example embodiments exposes the API information stored in the registry/repository 204 to the consumers. It may, for example, offer advanced browsing and search capabilities, e.g., to enable consumers to find the APIs they want or need. In other words, the registry/repository 204 may provide such advanced browsing and search capabilities to allow consumers to detect APIs that fulfill their requirements via the developer portal 206. Once a consumer has detected an API, the consumer can register for it via the developer portal 206. The developer portal 206 may also provide self-service support including, for example, collaboration techniques like communities and wikis. The developer portal 206 may support the automated "onboarding" of consumers.

The provider portal 208 of certain example embodiments provides a user interface to API providers. The provider can register new APIs and configure their capabilities via the provider portal 208. New APIs may be registered with, removed from, and/or otherwise modified in, the registry/repository 204 by the providers through the provider portal 208. The provider may use the provider portal 208 to approve API consumption requests.

Example Techniques for Detecting API Domains

As indicated above, one aspect of certain example embodiments involves the detection of potential domains based on the API consumption data. The API management system of certain example embodiments analyzes the API consumption data to identify which APIs are consumed together. The detection can be done based on analyzing the registration and by analyzing the runtime data, e.g., as set forth in further detail below.

Example Analysis of Registration Data

As mentioned above, a consumer might register for multiple APIs. A check may be made to determine whether there are any already-existing API domains. Certain example embodiments may perform this process by determining whether there are any API domains already containing the APIs selected by the consumer. Such API domains may be proposed to the consumer.

If there are no API domains, certain example embodiments may propose a domain containing only the APIs that have been selected. However, to obtain higher-quality proposals, the registration information from other consumers may be considered. Certain example embodiments thus may check whether there are any other consumers that consume the same set of APIs. If there are multiple consumers of the same API set, a corresponding domain is detected. Before the domain is proposed to the consumer, however it is presented to the provider to approve of the proposed API domain.

Example Analysis of Runtime Data

One problem of analyzing the registration data alone is that a consumer might have registered for many APIs but might not be using them all. This problem can be solved by, for example, monitoring and analyzing runtime data. This information may be considered together with the registration data discussed above. For instance, to identify APIs that can be combined into a domain, certain example embodiments may monitor API invocations and apply a set of rules to decide which APIs are consumed "together." FIG. 3 illustrates how domain detection rules may be applied in accordance with certain example embodiments. In other words, FIG. 3 helps illustrate the detection of events through the application of different rule sets on API invocation events.

The table in FIG. 3 shows the events representing the API calls performed by the consumer applications, and the events in the FIG. 3 table are from the proposed usage scenario. Each row represents an event reported by a gateway. The Event Type attribute distinguishes between various events. For domain detection, Call events are considered. The Time attribute provides the timestamp of the invocation. The Consumer attribute shows the consumer who has invoked the API, and this may be facilitated using the API key that is provided with the API invocation request. The location can be identified based on the IP address of the originator of the API invocation request. Finally the API attribute shows the invoked API. It will of course be appreciated that the information presented in this table is provided by way of example, and the information reported by the API gateway for an API call event is not limited to the information shown.

As may be inferred from the table in FIG. 3, the information about an API call does not need to be complete. For example, at 2013-05-30T09:30:10.250Z the API GetMapByZip has been invoked by an unknown user from an unknown location. Certain example embodiments may be configured to support incomplete information.

Two alternative rule sets are applied on the invocation events to detect related API calls. The first rule set (shown to the left) checks whether the API calls are performed by the same consumer and are from the same location. In addition, the rule set verifies that the time gap between related API calls is not larger than a predetermined time period (e.g., 500 milliseconds). The domain that is detected by applying these rules contains the APIs GetRealEstasteInfoByZip and GetSchoolsByZip. All other calls are performed by a different consumer, or the time gap between the calls is too large.

As the sample shows, a simple rule set is able to detect meaningful domains. To provide increased flexibility, the rule set for detecting domain can be user-configurable. For instance, certain example embodiments make it possible to change single parameters (e.g., the time period between calls, etc.), remove complete rules, add additional rules, etc., e.g., by and/or on behalf of a provider. The second rule set shown in FIG. 3 (to the right), which may be generated by modifying the first rule set, does not consider the time gap between API calls. Instead, it merely verifies that the calls are performed by the same consumer and from the same location. Applying this rule set detects a domain with the APIs GetRealEstasteInfoByZip, GetSchoolsByZip and GetMapByZip. It will be appreciated that certain example embodiments may make it possible to configured the rule set, etc., dynamically.

In addition to the rules that detect related APIs calls, rules can be defined to filter the detected domains. The filtering may, for example, consider other detected domains. To reduce false positives, for example, a rule can be defined that determines whether a domain is detected multiple times within a certain time frame. The parameters of this rule may include the time period and the number of detections that are necessary to keep a detected domain. It thus will be appreciated that it is possible to provide a plurality of simple and/or complex rules in different example implementations, and it also will be appreciated that rule sets may be user-configured, dynamically or otherwise.

Example Techniques for Combining Runtime and Registration Data

To further improve the quality of the detected domains, the registration and runtime data can be combined. As a result, the detected domains may be considered correlated with the registered domains. In other words, the registered domains may include those domains that have been defined based on analyzing runtime data. Detected domains can be filtered based on the registration data. For example, only those detected domains are kept if there are a certain number of consumers that have registered for the APIs of that domain.

Registration data can also be combined with runtime data to make proposals for modifying or extending existing domains. To generating extension proposals, the detected domains may, for example, be matched with the existing domains. If a detected domain includes a superset of an existing domain, a domain extension proposal is created. For example, assume that in the example usage scenario shown in FIG. 1, Consumer.com has already registered for a domain containing the APIs GetRealEstasteInfoByZip and GetSchoolsByZip. Based on the events above, the domain with the APIs GetRealEstasteInfoByZip, GetSchoolsByZip, and GetMapByZip is detected. Because the detected domain is a superset of the already existing domain, the domain extension proposal is generated to extend the domain including the GetRealEstasteInfoByZip and GetSchoolsByZip APIs with the API GetMapByZip.

Running an Example Domain Detection Process

Figure 4:
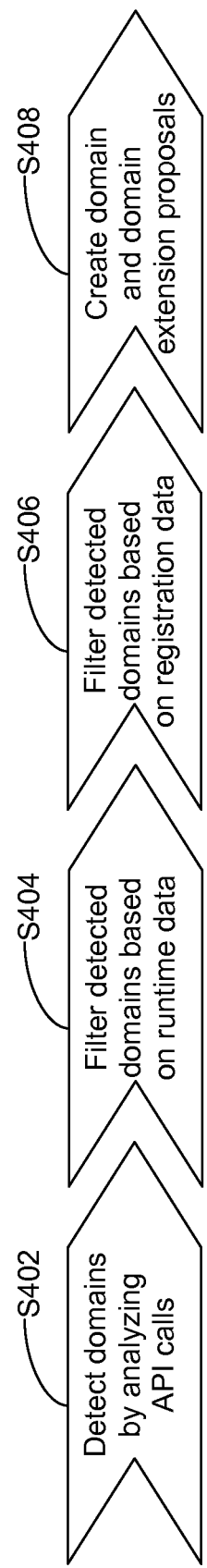
FIG. 4 summarizes an example domain detection process that may be used in connection with certain example embodiments.

It will be appreciated that the description above helps generate domain and domain extension proposals, e.g., in connection with the domain detection process. FIG. 4 summarizes an example domain detection process that may be used in connection with certain example embodiments. To briefly summarize, domains are detected by analyzing API calls in step S402. Detected domains are filtered based on runtime data in step S404. In step S406, detected domains are filtered based on registration data. Domain and domain extension proposals are generated in step S408.

The API call events generated by the API gateways and the registration data stored in the registry/repository also is considered. A technical challenge arises when it comes to analyzing the runtime data, however, in that the incoming API requests might be received by different gateways. To help address this concern, the runtime data may be consolidated to make it available for the domain detection process. As described above, the API gateways of certain example embodiments may write their events to an event channel, and the events on the channel may be read by the registry/repository. The registry/repository may have program logic built therein for initiating, and/or otherwise make its contents available to CEP analysis techniques. CEP analysis techniques may include, for example, the ability to perform continuous queries, identify time-based relations between events by applying windowing (e.g., through XQuery), etc., with the aid of processing resources such as at least one processor and a memory. A first set of continuous queries, for example, may be applied to detect domains by analyzing the API calls events. From the related API call events, domain detection events may be created. The domain detection events then may be filtered based on runtime data and registration data. Events corresponding to domain proposals and domain extension proposals finally may be generated.

The domain detection process can be applied in different ways. For the continuous generation of domain and domain extension proposals, it may be run continuously on the events generated by the API gateways. The process can additionally or alternatively be applied on-demand on historical data. To support the latter, certain example embodiments may store the API gateway events in an event store. Such an event store can be a database management system or any other system enabling the storing and querying of events, and the domain detection process can be applied on the events stored within the event store.

Example Approaches for Approving and Proposing Domains

Figure 5:
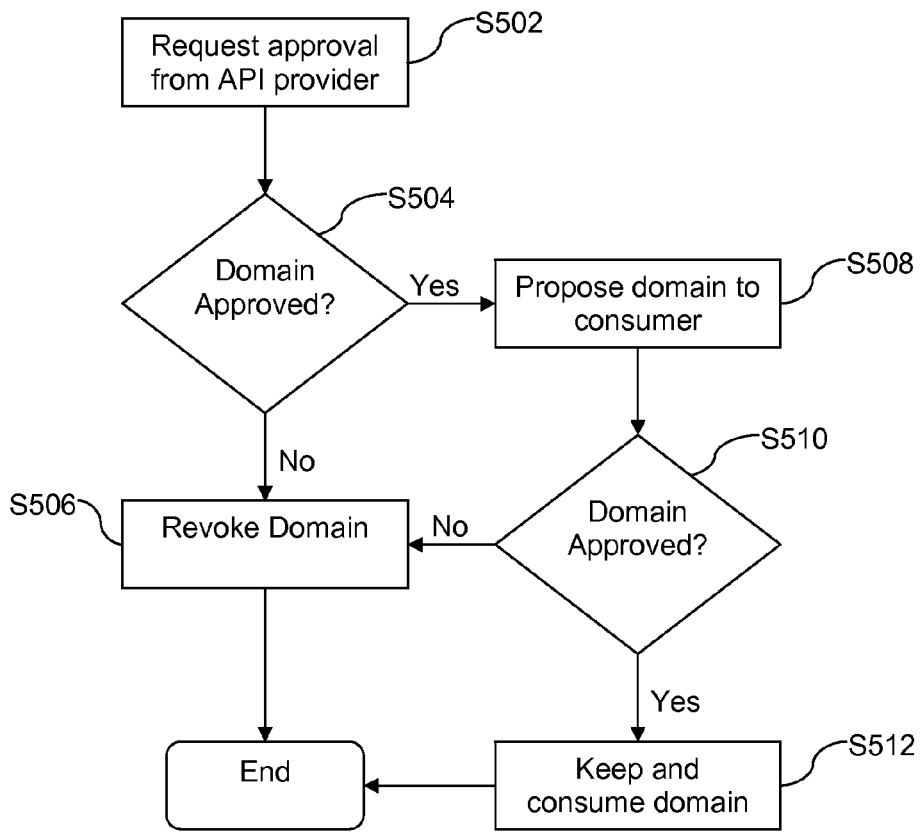
FIG. 5 is a flowchart showing an example process for proposing and approving domains in accordance with certain example embodiments.

Once a domain or a domain extension has been detected, the process for approving proposed domains and proposed domain extensions to the provider is initiated, and FIG. 5 is a flowchart showing an example process for proposing and approving domains in accordance with certain example embodiments.

In step S502, the information about the new detected domain is passed to the API provider with the request to approve the domains. As part of the approval, the provider can adjust the domain, e.g., by adding capabilities, if necessary or so desired. A determination is made in step S504 as to whether the provider agrees to the domain. If the provider does not agree to the domain, it is removed in step S506, and the process is ended. On the other hand, if it is approved by the provider, the domain is proposed to the identified consumer in step S508. If consumer accepts the domain, e.g., as determined in step S510, the consumption registration is triggered in step S512 and, as a result, the domain is stored and the consumer is registered, e.g., in and with the registry/repository, respectively. A domain key is generated and provided to the consumer. If the consumer does not accept the domain, it is revoked in step S506, and the process is ended.

To reduce the amount of human interaction, certain example embodiments allow for the configuration of automated approval. For example, approval may be provided automatically, under certain conditions. For instance, a provider may automatically provide approval for requests associated with preferred, trusted, or other consumers; for certain identified non-critical APIs; etc. Similarly, denials may be automatically generated by providers who are unknown, blacklisted, etc. Consumers may automatically accept all proposals, all proposals from a trusted provider, etc. Moreover, the provider can decide during the approval if the domain should be kept, even if any consumer does not accept the domain. As a result, automated approval configurations can be made more dynamic in certain example instances.

Example Domain Lifecycle

Figure 6:
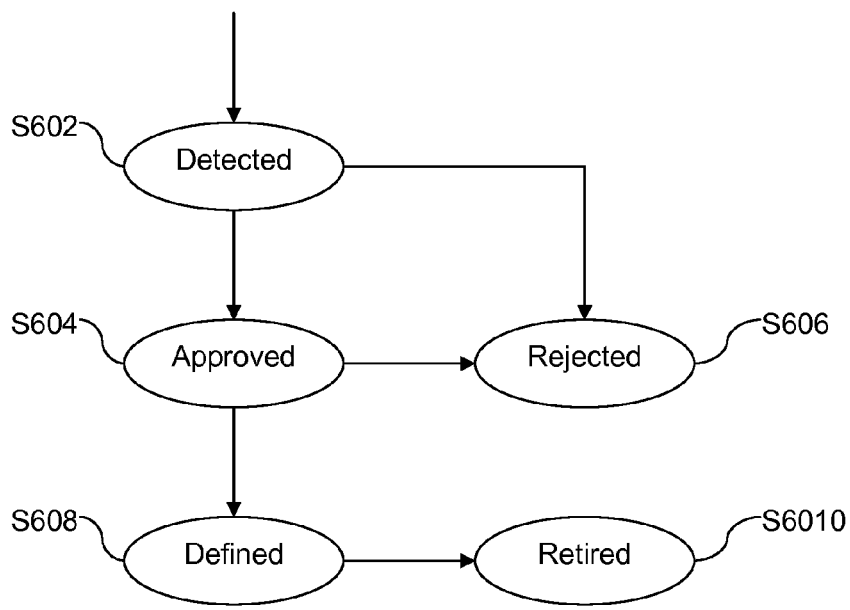
FIG. 6 is an example lifecycle model for domains, in accordance with certain exemplary embodiments.

While running through the process described above, a domain runs through multiple states of its lifecycle. FIG. 6 is an example lifecycle model for domains, in accordance with certain exemplary embodiments.

The initial state of an API domain is Detected, e.g., as indicated in state S602. Once the provider approves the domain, it is set to Approved (state S604). If it is rejected by the API provider, the domain is set to Rejected (state S606). If the consumer accepts the domain, it is set to Defined (state S608), otherwise it is set to Rejected (state S606). Domains can be moved from the Defined (state S608) to Retired (state S610), e.g., if they have reached the end of their lifetime.

Figure 7:
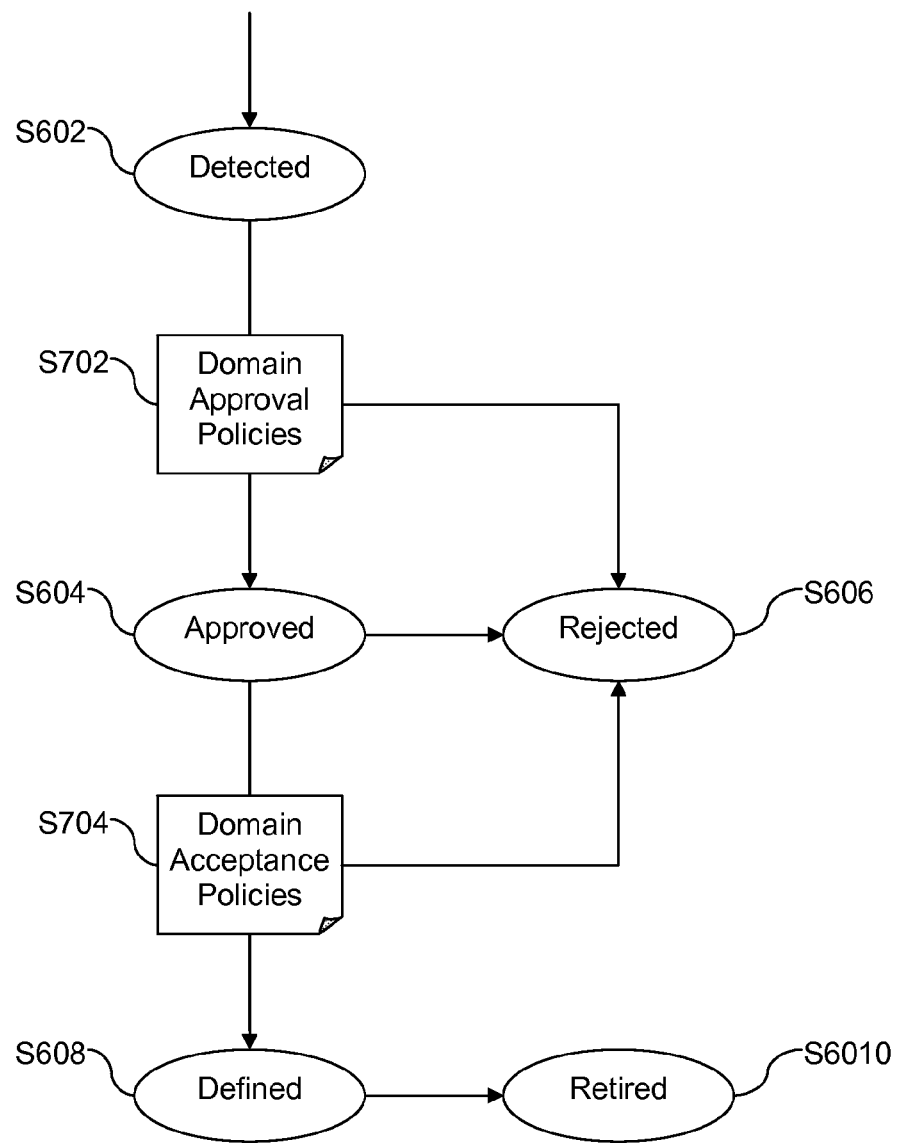
FIG. 7 illustrates an example domain lifecycle model with approval policies for approving and accepting domains in accordance with certain example embodiments.

The example domain lifecycle described above may be enforced through the lifecycle management capabilities of the registry/repository in certain example embodiments, and FIG. 7 illustrates an example domain lifecycle model with approval policies for approving and accepting domains in accordance with certain example embodiments. For example, the registry/repository may support the definition of policies governing the lifecycle state transitions. General purpose policies can be defined and, for example, an approval triggering policy S702 can be assigned to the Detected state S602, e.g., as post-state change policy. The effect is that the approval policy S702 is triggered after a domain has entered the Detected state S602.

The proposal of a domain to a consumer additionally or alternatively may be made via a similar approval policy. Therefore, a corresponding approval policy may be defined as a post-state change policy on the Approved state S604. To trigger the consumption registration process for an accepted domain, a pre-state change policy S704 for the Defined state S608 may be defined. The removal of rejected domains may be performed by a pre-state change policy on the Rejected state. Although the policies are grouped together in FIG. 7 for ease of reference, it will be appreciated that they may be defined at least in part by different parties and/or apply to different states in different implementations.

Certain example embodiments may be enhanced through its lifecycle policy management and/or on each request to include the capability to introduce an improved data protection mechanism for customer/provider confidence. Such enhancements may be helpful, e.g., so that the consumer and/or the provider could be allowed to specify that personal data should not be kept beyond use, never exposed with the consumer/provider identity, etc. This also could help address consumer information protection issues oftentimes raised by the "fine-print" associated with current systems that request an acceptance of oftentimes complex "shrink-wrap" and/or "click-wrap" licenses that oftentimes are not read.

Example Implementation

This section provides an example implementation, and it will be appreciated that the components of certain example embodiments can be implemented based on existing technology. This may include, for example, the API gateway, the registry/repository, the developer and the provider portals, etc.

As described above, the domain detection process can be implemented by using continuous queries and windowing using a suitable query language such as that defined by, for example, the XQuery 3.0 specification. It will be appreciated, however, that implementations are not limited to XQuery 3.0, and any CEP query language with windowing capabilities may be used. The registry/repository of the disclosed system may have a query processor for the CEP query language for executing the domain detection queries on the event stream. Because XQuery operates on XML data, a simplified XML representation for these events is assumed. An example call event therefore is as follows:

```
<event>
  <header>
    <type>Call</type>
  </header>
  <body>
    <time>2013-05-30T09:30:10.100Z</time>
    <consumer>RealEstate.com</consumer>
    <location>109.22.161.16</location>
    <api>GetRealEstasteInfoByZip</api>
  </body>
</event>
```

The XML directly corresponds to the previously described table-structured events. The following example XQuery identifies related API call events. The first sample query detects domains by finding related API calls in the event stream issued by the API gateways.

```
let $period:=xs:dayTimeDuration("PT0.5s")
for sliding window $eventWindow in getEvents( )
    start $start when $start/header/type="Call"
    end   $end   when   $end/body/time-$start/body/time>$period
let $apis:=
    for $event in $eventWindow
    where $event/body/consumer=$start/body/consumer
    and $event/body/location=$start/body/location
    return $event/body/api
where count($apis)>1
return
    <domain>
    <detectionTime>{current-date-time}</detectionTime>
    <apis>{$apis}</apis>
    </domain>
```

The query creates a sliding window for each call event. The sliding window ends after the given time period of 500 milliseconds. The windows are read from the getEvents( ) function, which accesses the events stream between the gateways and the registry repository. From each window, all call events that have the same consumer and location as the start item of the window are extracted. If there is more than just a single event, the query creates a domain for the window.

The next example query verifies that a domain is detected multiple times within a given time frame. The query assumes the function getDomains( ) is defined by the above query.

```
let $period:=xs:dayTimeDuration("PT10D")
let $detectionCount:=10
for sliding window $domainWindow in getDomains( )
    start $start when true( )
    end   $end   when   $end/detectionTime-$start/detectionTime>$period
let $domains:=
    for $domain in $domainWindow
    where deep-equal($domain/apis, $start/apis)
    return $domain
where count(domains)>$detectionCount
return $start
```

The query creates a sliding window for each detected domain. In each window, it collects the domains that are detected within 10 days. If there at least 10 domains with the same API set, the domain that has triggered the window creation is kept.

The next query shows how the detected domains can be filtered according to already-registered domains. The query assumes a function filteredDomains( ) that is defined by the above query.

```
for $detectedDomain in filteredDomains( )
where
    not (
    for $domain in registeredDomains( )
    where deep-equal($domain, $detectedDomain)
    return domain
```

)
return $detectedDomain

For accessing the registered domains, the query calls the function registeredDomains( ). The detected domain is only kept if there is no registered domain that has the same API set as the detected one.

It will be appreciated that these scenarios are provided by way of example and that the example embodiments described herein may find practical application in a wide variety of similar and different scenarios.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An application programming interface (API) management system, comprising:
   a plurality of APIs, each said API having a native endpoint;
   a plurality of gateways providing virtual endpoints to respective APIs, the gateways being configured to identify consumers attempting to access the APIs and forward API calls for authorized consumers to the native endpoints;
   a registry stored on a non-transitory computer readable storage medium, the registry storing (a) registration information indicating which consumers have registered for which APIs, (b) metadata that includes information concerning operations supported by, and native and virtual endpoint information for, the APIs, and (c) runtime data from the gateways for at least API call type events, the runtime data including, for each API call type event, a timestamp, a consumer identifier, a location, and an identifier of the API being called;
   a communications channel defined between the gateways and the registry, the communications channel being configured to transmit runtime data from the gateways to the registry; and
   processing resources comprising at least one processor and a memory, the processing resources being configured to:
      detect API domains by analyzing the registration information and the runtime data from the gateways, each said detected API domain including at least two of the APIs, and
      for a given detected API domain,
         receiving an indication as to whether the respective detected API domain is approved of by a provider of the APIs included therein, and
         in response to the respective detected API domain being approved of by the provider, registering the respective detected API domain with the registry by storing in the registry metadata including information concerning operations supported by, and native and virtual endpoint information for, the respective detected API domain.

2. The system of claim 1, wherein the processing resources are further configured to respond to a consumer registering for a plurality of APIs by at least:
   generating API domain proposals by analyzing the registration information and the runtime data from the gateways, each said API domain proposal including at least two of the APIs, and
   for each said API domain proposal,
      receiving first input indicating whether the respective domain proposal is approved of by a provider of the APIs included therein,
      in response to the respective domain proposal being approved of by the provider, receiving second input indicating whether the respective domain proposal is accepted by the consumer registering for the APIs, and
      in response to the respective domain proposal being approved of by the provider and accepted by the consumer registering for the APIs, registering the respective domain proposal with the registry as an API domain by storing in the registry registration information indicating that the consumer has registered for the respective API domain, and by storing metadata including information concerning operations supported by, and native and virtual endpoint information for, the respective API domain.

3. The system of claim 2, wherein the processing resources are further configured to at least analyze the registration information in order to identify whether there is an existing API domain including the plurality of APIs being registered for by the consumer and, if so:
   receive third input indicating whether the existing API domain is accepted by the consumer; and
   in response to the existing API domain being accepted by the consumer, register the consumer as a consumer of the existing API domain.

4. The system of claim 3, wherein in the event that there are no existing API domains including the plurality of APIs being registered for by the consumer, the processing resources are further configured to at least generate API domain proposals based at least in part on whether other consumers have registered for a set of APIs including at least the APIs being registered for by the consumer.

5. The system of claim 4, wherein the processing resources are further configured to at least analyze the runtime data from the gateways by applying at least one set of one or more rules thereto in order to identify APIs that likely are consumed together and thus should be included in an API domain proposal.

6. The system of claim 5, wherein the at least one set of rules groups together APIs that are invoked by the same consumer and from the same location, and that are invoked within a predetermined timeframe.

7. The system of claim 1, wherein:
   the processing resources are further configured to at least analyze the runtime data from the gateways by applying at least one set of one or more rules thereto in order to identify APIs that likely are consumed together and thus should be included in an API domain proposal presented for approval by the provider of the APIs therein, and at least one of said set of rules groups together APIs that are invoked by the same consumer and from the same location.

8. The system of claim 7, wherein the processing resources are further configured to filter API domain proposals based on the registration data so that a given API domain proposal is presented as a detected API domain only if there are a predetermined number of consumers who have each registered for the all of the APIs in that given API domain proposal.

9. The system of claim 1, wherein the gateways are configured to identify consumers making API calls by introspecting the API keys provided with the respective API calls.

10. The system of claim 1, wherein the processing resources are further configured to at least generate a proposal for extending an already-existing API domain if a detected domain includes a superset of the APIs included in that already-existing API domain.

11. The system of claim 1, wherein the communications channel is an event channel, and wherein the gateways are configured to send to the event channel events with API invocation information and runtime information related to API invocations.

12. The system of claim 11, wherein the processing resources are further configured to at least subject the events on the event channel to complex event processing (CEP) queries.

13. The system of claim 11, further comprising complex event processing (CEP) queries run on the event channel, the CEP queries including continuous queries that, through windowing, identify time-based relations between different API call type events.

14. The system of claim 13, wherein the CEP queries at least:
 identify related API call type events;
 create domain detection events in response to the identification of related API call type events;
 filter created domain detection events based on the runtime data and the registration data; and
 generate events corresponding to domain proposals and/or domain extension proposals in response to the filtering.

15. The system of claim 1, wherein the gateways are further configured to provide service-level agreement (SLA) enforcement.

16. The system of claim 1, wherein the registry is configured to enforce a predefined domain lifecycle in connection with API domains, the predefined domain lifecycle being defined in accordance with one or more associated policies.

17. The system of claim 16, wherein the policies indicate when proposed API domains should be automatically approved by a provider and/or accepted by a consumer.

18. A method of managing application programming interfaces (APIs), the method comprising:
 providing a plurality of gateways providing virtual endpoints to APIs that have respective native endpoints, the gateways being configured to identify consumers attempting to access the APIs and forward API calls for authorized consumers to the native endpoints;
 storing, in a registry provided on a non-transitory computer readable storage medium, (a) registration information indicating which consumers have registered for which APIs, (b) metadata that includes information concerning operations supported by, and native and virtual endpoint information for, the APIs, and (c) runtime data from the gateways for at least API call type events, the runtime data including, for each API call type event, a timestamp, a consumer identifier, a location, and an identifier of the API being called;
 detecting, via at least one processor, API domains by analyzing the registration information and the runtime data from the gateways, each said detected API domain including at least two of the APIs; and
 for at least some of the detected API domains and using the at least one processor:
  receiving an indication as to whether the respective detected API domain is approved of by a provider of the APIs included therein, and
  in response to the respective detected API domain being approved of by the provider, registering the respective detected API domain with the registry by storing in the registry metadata including information concerning operations supported by, and native and virtual endpoint information for, the respective detected API domain.

19. The method of claim 18, further comprising applying to the runtime data from the gateways at least one set of one or more rules in order to identify APIs that likely are consumed together and thus should be included in an API domain proposal presented to the provider of the APIs therein for approval.

20. The method of claim 19, further comprising filtering API domain proposals based on the registration data so that a given API domain proposal is presented as a detected API domain only if there are a predetermined number of consumers who have each registered for the all of the APIs in that given API domain proposal.

21. The method of claim 19, wherein at least one of said set of rules groups together APIs that are invoked by the same consumer and from the same location, and within a predetermined timeframe.

22. The method of claim 18, further comprising generating a proposal to extend an already-existing API domain if a detected domain includes a superset of the APIs included in that already-existing API domain.

23. The method of claim 18, further comprising running complex event processing (CEP) queries on events provided from the gateways to an event bus, the CEP queries including continuous queries that, through windowing, identify time-based relations between different API call type events.

24. The method of claim 23, wherein the CEP queries at least:
 identify related API call type events;
 create domain detection events in response to the identification of related API call type events;
 filter created domain detection events based on the runtime data and the registration data; and
 generate events corresponding to domain proposals and/or domain extension proposals in response to the filtering.

25. The method of claim 18, further comprising enforcing service-level agreements (SLAs) via the gateways.

26. The method of claim 18, further comprising enforcing a predefined policy-based domain lifecycle in connection with API domains via the registry.

27. A non-transitory computer readable storage medium tangibly storing instructions that, when executed by at least one processor of a computer system, are configured to at least perform the method of claim 18.

28. A method of managing application programming interfaces (APIs), the method comprising:
 providing a plurality of gateways providing virtual endpoints to APIs that have respective native endpoints, the gateways being configured to identify consumers attempting to access the APIs and forward API calls for authorized consumers to the native endpoints;

storing, in a registry provided on a non-transitory computer readable storage medium, (a) registration information indicating which consumers have registered for which APIs, (b) metadata that includes information concerning operations supported by, and native and virtual endpoint information for, the APIs, and (c) runtime data from the gateways for at least API call type events, the runtime data including, for each API call type event, a timestamp, a consumer identifier, a location, and an identifier of the API being called; and responding to a consumer registering for a plurality of APIs by using at least one processor for at least:

generating, via at least one processor, API domain proposals by analyzing the registration information and the runtime data from the gateways, each said API domain proposal including at least two of the APIs, and for at least some of said API domain proposals, receiving first input indicating whether the respective domain proposal is approved of by a provider of the APIs included therein, in response to the respective domain proposal being approved of by the provider, receiving second input indicating whether the respective domain proposal is accepted by the consumer registering for the APIs, and in response to the respective domain proposal being approved of by the provider and accepted by the consumer registering for the APIs, registering the respective domain proposal with the registry as an API domain by storing in the registry registration information indicating that the consumer has registered for the respective API domain, and by storing metadata including information concerning operations supported by, and native and virtual endpoint information for, the respective API domain.

29. The method of claim 28, further comprising:

determining whether there is an existing API domain including the plurality of APIs being registered for by the consumer;

in response to a determination that there is an existing API domain including the plurality of APIs being registered for by the consumer:

receive third input indicating whether the existing API domain is accepted by the consumer, and in response to the existing API domain being accepted by the consumer, register the consumer as a consumer of the existing API domain; and in response to a determination that there are no existing API domains including the plurality of APIs being registered for by the consumer:

generating API domain proposals based at least in part on whether other consumers have registered for a set of APIs including at least the APIs being registered for by the consumer, and applying at least one set of one or more rules to the runtime data in order to identify APIs that likely are consumed together and thus should be included in an API domain proposal.

30. A non-transitory computer readable storage medium tangibly storing instructions that, when executed by at least one processor of a computer system, are configured to at least perform the method of claim 28.

* * * * *